US008316211B2

(12) United States Patent
Savagaonkar et al.

(10) Patent No.: US 8,316,211 B2
(45) Date of Patent: *Nov. 20, 2012

(54) GENERATING MULTIPLE ADDRESS SPACE IDENTIFIERS PER VIRTUAL MACHINE TO SWITCH BETWEEN PROTECTED MICRO-CONTEXTS

(75) Inventors: Uday Savagaonkar, Portland, OR (US); Madhavan Parthasarathy, Portland, OR (US); Ravi Sahita, Beaverton, OR (US); David Durham, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 985 days.

This patent is subject to a terminal disclaimer.

(21) Appl. No.: 12/165,640

(22) Filed: Jun. 30, 2008

(65) Prior Publication Data
US 2009/0327648 A1 Dec. 31, 2009

(51) Int. Cl.
*G06F 12/00* (2006.01)
(52) U.S. Cl. ........ 711/207; 711/170; 711/173; 711/200; 711/202; 711/203; 711/205
(58) Field of Classification Search .................. 711/170, 711/173, 202, 203, 205, 207, E12.061
See application file for complete search history.

(56) References Cited

U.S. PATENT DOCUMENTS

| | | | | |
|---|---|---|---|---|
| 5,790,979 A | * | 8/1998 | Liedtke | 711/206 |
| 7,555,592 B1 | * | 6/2009 | Koryakin et al. | 711/6 |
| 2004/0177243 A1 | * | 9/2004 | Worley, Jr. | 713/2 |
| 2006/0026384 A1 | * | 2/2006 | Brandt et al. | 711/209 |
| 2008/0168461 A1 | * | 7/2008 | Arndt et al. | 718/104 |

* cited by examiner

*Primary Examiner* — Tuan Thai
*Assistant Examiner* — Zhuo Li
(74) *Attorney, Agent, or Firm* — Thomas R. Lane

(57) ABSTRACT

Embodiments of an invention for generating multiple address space identifiers per virtual machine to switch between protected micro-contexts are disclosed. In one embodiment, an apparatus includes privileged mode logic, an interface, and memory management logic. The privileged mode logic is to transfer control of the processor among a plurality of virtual machines. The interface is to perform a transaction to fetch information from a memory. The memory management logic is to translate an untranslated address to a memory address. The memory management logic includes a storage location, a series of translation stages, determination logic, and a translation lookaside buffer. The storage location is to store an address of a data structure for the first translation stage. Each of the translation stages includes translation logic to find an entry in a data structure based on a portion of the untranslated address. Each entry is to store an address of a different data structure for the first translation stage, an address of a data structure for a successive translation stage, or the physical address. The determination logic is to determine whether an entry is storing an address of a different data structure for the first translation stage. The translation lookaside buffer is to store translations. Each translation lookaside buffer entry includes an address source identifiers. Each address source identifier is to identify a unique micro-context. Each address source identifier is based on a virtual partition identifier. At least two of the of virtual partition identifiers are associated with one of the virtual machines.

9 Claims, 4 Drawing Sheets

METHOD 200

210 load control program → 220 load SW components → 230 SW components request micro-contexts → 240 control program provides micro-context IDs → 250 SW components advertise transition pages → 260 access control policy applied to transition page linkages → 270 map transition pages into page table structures

METHOD 400

GENERATING MULTIPLE ADDRESS SPACE IDENTIFIERS PER VIRTUAL MACHINE TO SWITCH BETWEEN PROTECTED MICRO-CONTEXTS

BACKGROUND

1. Field

The present disclosure pertains to the field of information processing, and more particularly, to the field of memory management and protection.

2. Description of Related Art

Memory based attacks are a significant threat to the security of information processing systems. Some such attacks involve storing malicious code such as a virus or a worm in the memory of a computer system, then exploiting bugs and/or buffer overflows while running legitimate programs to transfer control to the malicious code. One approach to preventing this type of attack is to divide the address space of a process or a context into a number of smaller "micro-contexts" so that program functions, modules, or other components, or portions of components, may be assigned to a micro-context and securely executed within a process, context, or execution environment, such as a virtual machine. Micro-context switches may be monitored, for example, by trapping to a virtual machine monitor ("VMM"), to protect these components from other program components, including program components operating at higher privilege level.

BRIEF DESCRIPTION OF THE FIGURES

The present invention is illustrated by way of example and not limitation in the accompanying figures.

DETAILED DESCRIPTION

Embodiments of an invention for generating multiple address space identifiers per virtual machine to switch between protected micro-contexts are described. In this description, numerous specific details, such as processor and system configurations, may be set forth in order to provide a more thorough understanding of the present invention. It will be appreciated, however, by one skilled in the art, that the invention may be practiced without such specific details. Additionally, some well-known structures, circuits, and other features have not been shown in detail, to avoid unnecessarily obscuring the present invention.

As described in the background section, micro-contexts may be managed and protected by trapping a micro-context switch to a virtual machine monitor, operating system, or other supervisory program. Embodiments of the present invention provide for switching between protected micro-contexts to occur without a virtual machine exit, exception, or other control flow change that would consume many clock cycles. Embodiments of the present invention also provide for sharing and updating of data between micro-contexts, without the performance penalty that would be imposed by using micro-context switches to maintain the shared data.

Figure 1:
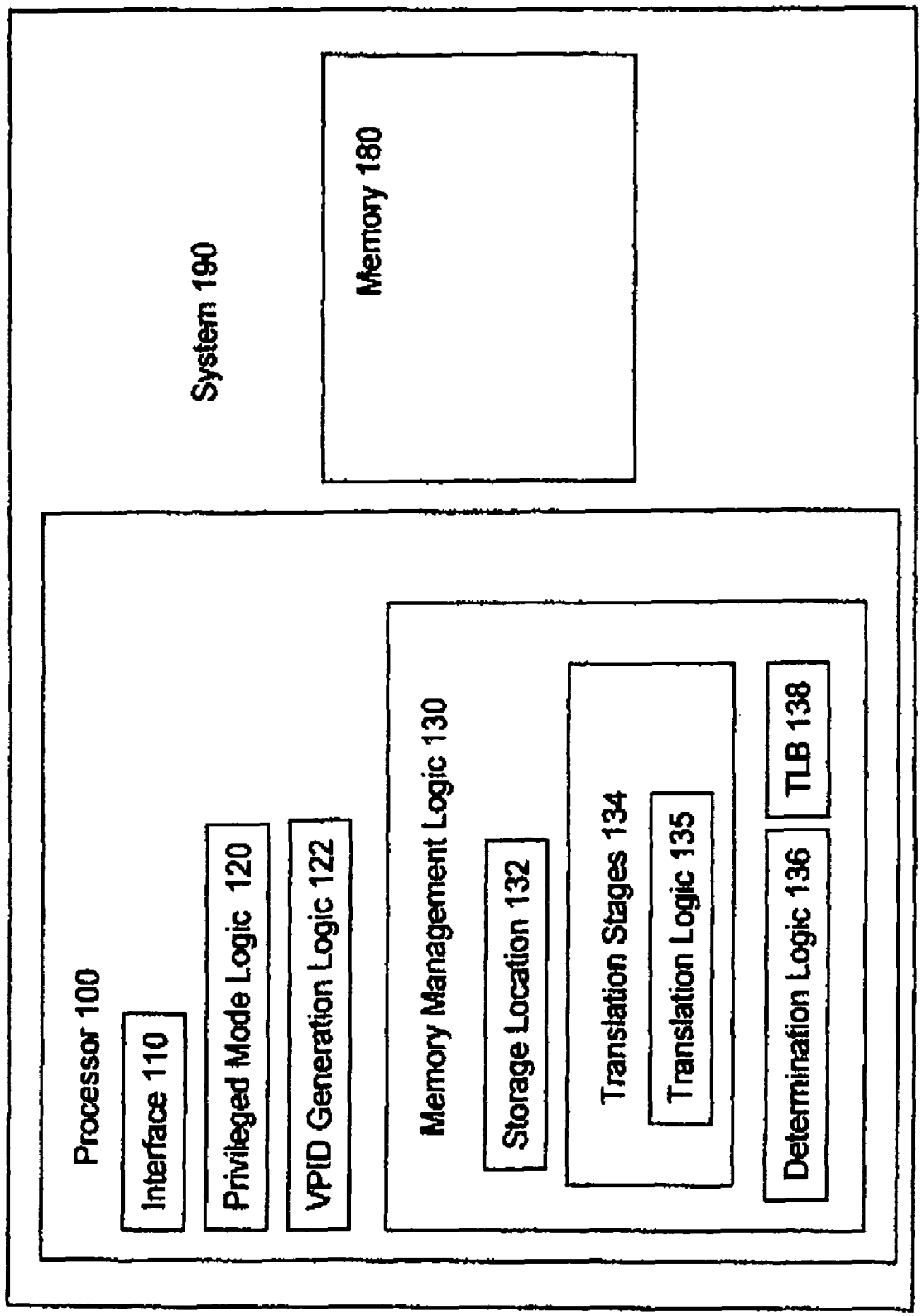
FIG. 1 illustrates a processor including logic to generate multiple virtual processor identifiers per virtual machine to switch between protected micro-contexts according to an embodiment of the present invention.

FIG. 1 illustrates processor 100, in system 190, according to an embodiment of the present invention. Processor 100 may be any type of processor, including a general purpose microprocessor, such as a processor in the Intel® Pentium® Processor Family, Itanium® Processor Family, or other processor family from Intel® Corporation, or another processor from another company, or a special purpose processor or microcontroller. Processor 100 may include multiple threads and multiple execution cores, in any combination. Processor 100 includes interface 110, privileged mode logic 120, virtual partition identification ("VPID") generation logic 122, and memory management logic 130. Processor 100 may also include any other circuitry, structures, or logic not shown in FIG. 1.

Interface 110 may include a bus unit or any other unit, port, or interface to allow processor 100 to communicate with memory 180 through any type of bus, point to point, or other connection, directly or through any other component, such as a chipset or memory controller. Memory 180 may be dynamic random access memory, or any other type of medium readable by processor 100.

Privileged mode logic 120 may include any circuitry, logic, microcode, or other structures to enable, assist, or support the sharing and/or allocating of resources among virtual machines (each, a "VM") running on processor 100, and the transfer of control from a VMM or other control program, having direct control over the resources, to software programs or components ("guests") running within a virtual machine (a "VM entry"), the transfer of control back to the VMM (a "VM exit"), and the transfer of control among VMs. A virtual machine control structure ("VMCS") or other data structure may be used to store state, control, and other information for each VM. Each VM may be assigned one or more VPIDs, stored in a VMCS field, to uniquely identify each VM.

Processor 100 also includes memory management logic 130 to manage the memory space of processor 100. Memory management logic supports the use of virtual memory to provide software, including guest software running in a VM, with an address space for storing and accessing code and data that is larger than the address space of the physical memory in the system, e.g., memory 180. The virtual memory space of processor 100 may be limited only by the number of address bits available to software running on the processor, while the physical memory space of processor 100 is further limited to the size of memory 180. Memory management logic 130 supports a memory management scheme, such as paging, to swap the executing software's code and data in and out of memory 180 on an as-needed basis. As part of this scheme, the software may access the virtual memory space of the processor with an untranslated address that is translated by the processor to a translated address that the processor may use to access the physical memory space of the processor.

Accordingly, memory management logic 130 includes one or more storage locations 132, one or more series of translation stages 134, determination logic 136, and translation lookaside buffer ("TLB") 138. Translation stages 134 include translation logic 135 to perform address translations, for example the translation of a virtual, logical, linear, or other untranslated address to a physical or other translated address, according to any known memory management technique, such as paging. To perform these address translations, translation stages 134 refer to one or more data structures stored in processor 100, memory 180, any other storage location in system 190 not shown in FIG. 1, and/or any combination of these locations. The data structures may include page directories and page tables according to the architecture of the Pentium® Processor Family, as modified according to embodiments of the present invention, and/or a table stored in TLB 138.

Storage location 132 may be any register or other storage location used to store a pointer to a data structure used by translation stages 134. In one embodiment, storage location 132 may be that portion of the CR3 register referred to as PML4 Base, used to store the page map level 4 base address, according to the architecture of the Pentium® Processor Family.

In one embodiment, translation stages 134 receive a linear address provided by an instruction to be executed by processor 100. Translation stages 134 use portions of the linear address as indices into hierarchical tables, including page tables, to perform a page walk. The page tables contain entries, each including a field for a base address of a page in memory 180, for example, bits 39:12 of a page table entry according to the Pentium® Processor Family's Extended Memory 64 Technology. Any page size (e.g., 4 kilobytes) may be used within the scope of the present invention. Therefore, the linear address used by a program to access memory 180 may be translated to a physical address used by processor 100 to access memory 180.

The linear address and the corresponding physical address may be stored in TLB 138, so that the appropriate physical address for future accesses using the same linear address may be found in TLB 138 and another page walk is not required. The contents of TLB 138 may be flushed when appropriate, for example on a context switch, typically by an operating system.

In a virtual machine environment, a VMM may need to have ultimate control over the resources of memory management logic 130 in order to protect the memory space of one guest from another guest. Therefore, in one embodiment, privileged mode logic 120 may include logic to cause a VM exit if a guest issues an instruction that is intended to change the contents of storage location 132 or TLB 138, or otherwise modify the operation of memory management logic 130. The VMM may then maintain memory management logic 130 along with multiple sets of paging or other data structures (e.g., one set per VM) to provide for correct operation of system 190 such that each virtual machine appears to provide complete control of its memory management resources to an OS.

In another embodiment, memory management logic 130 may include hardware to support virtual machines. For example, translation stages 134 may be configured to translate a linear address to a physical address, using a data structure pointed to by the contents of storage location 132, as described above. If this translation is performed for a guest, the linear address is referred to as a guest linear address, a resulting physical address is referred to as a guest physical address ("GPA"), and additional translations are needed to translate GPAs to host physical addresses ("HPA"s). These additional translations may use an additional series of translation stages 134, using additional data structures, the first of which may be pointed to by an additional storage location 132. In this embodiment, the storage location 132 and the translation data structures for the guest may be maintained by an OS running on a virtual machine, while the storage location 132 and the translation data structures for the host are maintained by the VMM. These additional translations may be enabled by a VM entry and disabled by a VM exit.

Typically, an entry in a translation data structure includes an address or a portion of an address that is combined, by translation logic 135, with a portion of the untranslated address to point to an entry in a successive translation data structure, i.e., a translation data structure for the next stage. However, an entry in the translation data structure for the last stage may be or may include a physical address of a location in memory 180. In an embodiment supporting virtual machines, an address from an entry in a data structure may undergo an additional translation before it is used as a pointer to the next stage. As an example, one embodiment may use page tables to translate a linear address to a physical address when not operating within a virtual machine. When operating within a virtual machine, these same page tables may be used, but between each page table and after the last page table, an additional translation is performed, using a set of extended page tables, to translate a page table entry from a GPA to an HPA. After translation, a GPA and its corresponding HPA may be stored in TLB 138, so that another page walk is not required. Embodiments of the present invention may be implemented in page tables, extended page tables, and/or any other data structure used by memory management logic 130.

In one embodiment using extended page tables, storage location 132 is to store an HPA which is a pointer to the first extended page table. A first stage of translation stages 134 combines this pointer with a first portion (e.g., bits 38:30 of a 64-bit address) of a GPA to find an entry in the first extended page table. This entry includes an HPA that is a pointer to a second extended page table. A second stage of translation stages 134 combines this pointer with a second portion (e.g., bits 29:21 of the 64-bits address) of the GPA to find an entry in the second extended page table. This entry includes an HPA that is a pointer to a third extended page table. A third stage of translation stages 134 combines this pointer with a third portion (e.g., bits 20:12 of the 64-bit address) of the GPA to find an entry in the third extended page table. This entry includes the translated address.

However, an embodiment of the present invention provides for any entry in any of these three extended page tables to be a "transition" entry. Each entry may be formatted to include an address field (e.g., bits 59:12 of a 64-bit entry) and a transition indicator field (e.g., bit 3 of the 64-bit entry). Determination logic 136 reads the transition indicator field to determine whether an entry is a transition entry. In one embodiment, the transition indicator field is a single bit that may be set, by a VMM for example, to a value of '1' to indicate that the entry is a transition entry. If the entry is not a transition entry, then the entry is used as the address of the next extended page table or as the translated address, as described above. However, if the entry is a transition entry, then the address field of the transition entry is used as a pointer to a different extended page table for the first stage, and the translation process is restarted at the first stage.

Therefore, different micro-contexts may be created by using different sets of extended page tables, and an instruction from one micro-context may refer to an instruction or data in a different micro-context by including a transition entry in one of its extended page tables. Creation and maintenance of the micro-contexts may be performed by the VMM and/or any other supervisory or other entity. Creation may include assigning a micro-context to any information, such as instructions and/or data associated with program components, as it is stored in memory 180, by labeling the pages on which it is stored with an attribute that identifies the micro-context. For example, the attribute may be an eight bit "page color" value, similar to a pixel color value in a graphical display. A page may be labeled with its color by storing their color value in a field in the page table entry that points to the page.

Separate micro-contexts may be created by maintaining page tables such that, in the absence of transition page table entries, only pages of a first color or group of colors may be reached from a first page table pointer, only pages of a second color or group of colors may be reached from a second page table pointer, only pages of a third color or group of colors may be reached from a third page table pointer, and so on. Therefore, each micro-context has its own set of page tables, and, in the absence of transition page table entries, referencing one micro-context from a different micro-context requires a change to the value in storage location 132, which may be performed only by the VMM or other supervisory software responsible for protecting the micro-contexts. In some embodiments, exceptions to this protection scheme are possible, such as by using special colors to represent micro-contexts that are not protected, by using special colors to represent micro-contexts that are allowed to reference protected micro-contexts, and/or by using special fields in page table entries to mark pages as read-only or otherwise indicate that they may be referenced under certain conditions. In the presence of transition page table entries, the VMM may protect micro-contexts by having exclusive access to write to the transition indicator field of page table entries and/or to store transition page table entries in page tables.

Figure 2:
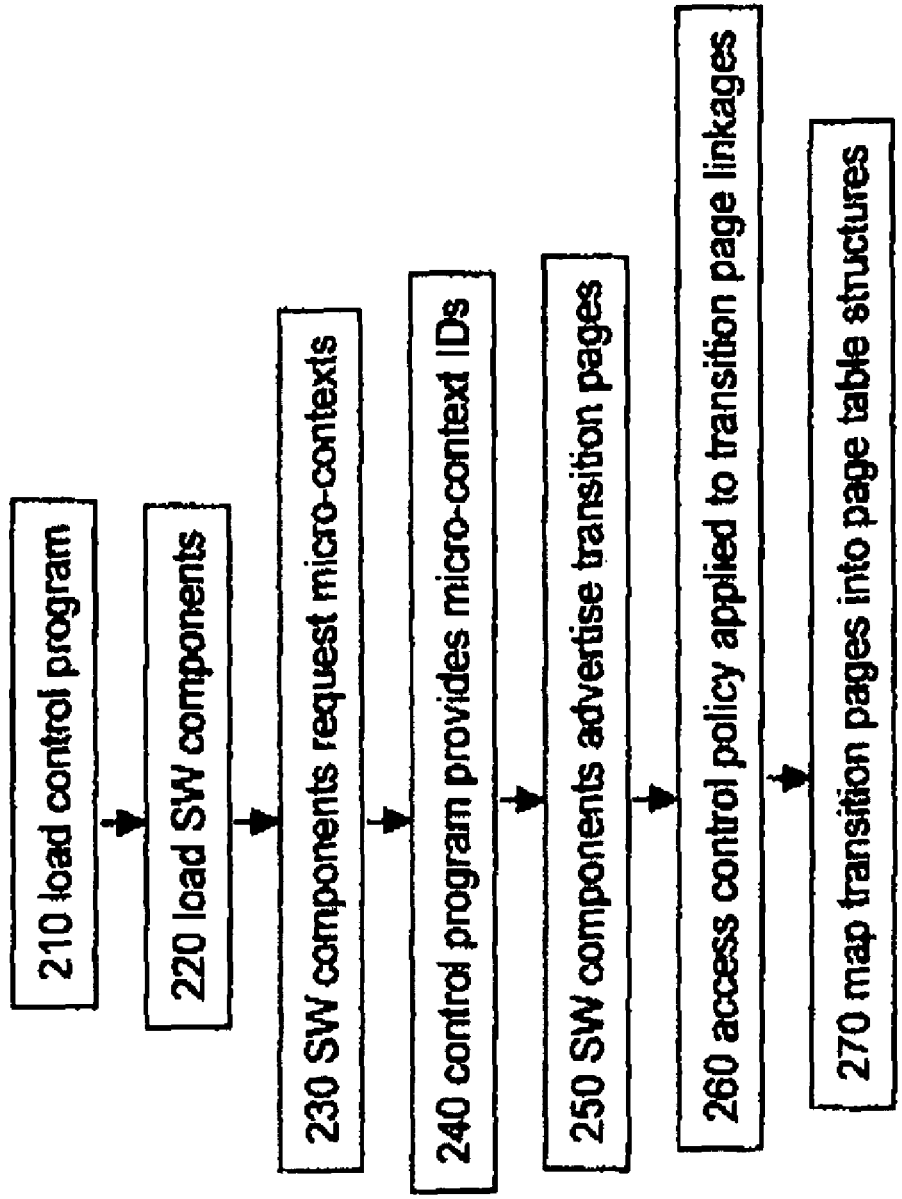
FIG. 2 illustrates a method for setting up protected micro-contexts using transition page table entries according to an embodiment of the present invention.

FIG. 2 illustrates method 200 for setting up protected micro-contexts using transition page table entries according to an embodiment of the present invention. In box 210, a VMM or other control program is loaded into memory. In box 220, the control program loads guests or other software programs or components into memory. In box 230, software components request separate micro-contexts from the control program for different pages or groups of pages. In box 240, the control program provides separate micro-context identifiers to the requesting software components for each separate micro-context. Each identifier corresponds to a different value for the extended page table pointer and therefore to a different set of extended page tables. In box 250, software components advertise, or otherwise make known to other software components, their transition pages, i.e., pages where they may be accessed by other software components. In box 260, an access control policy is applied to transition page linkages to determine which software components may access other software components through their transition pages. In box 270, the transition pages are mapped into page table structures, for example, by a control program mapping transition entries into the page tables of one software component that point to the page tables of another software component.

Figure 3:
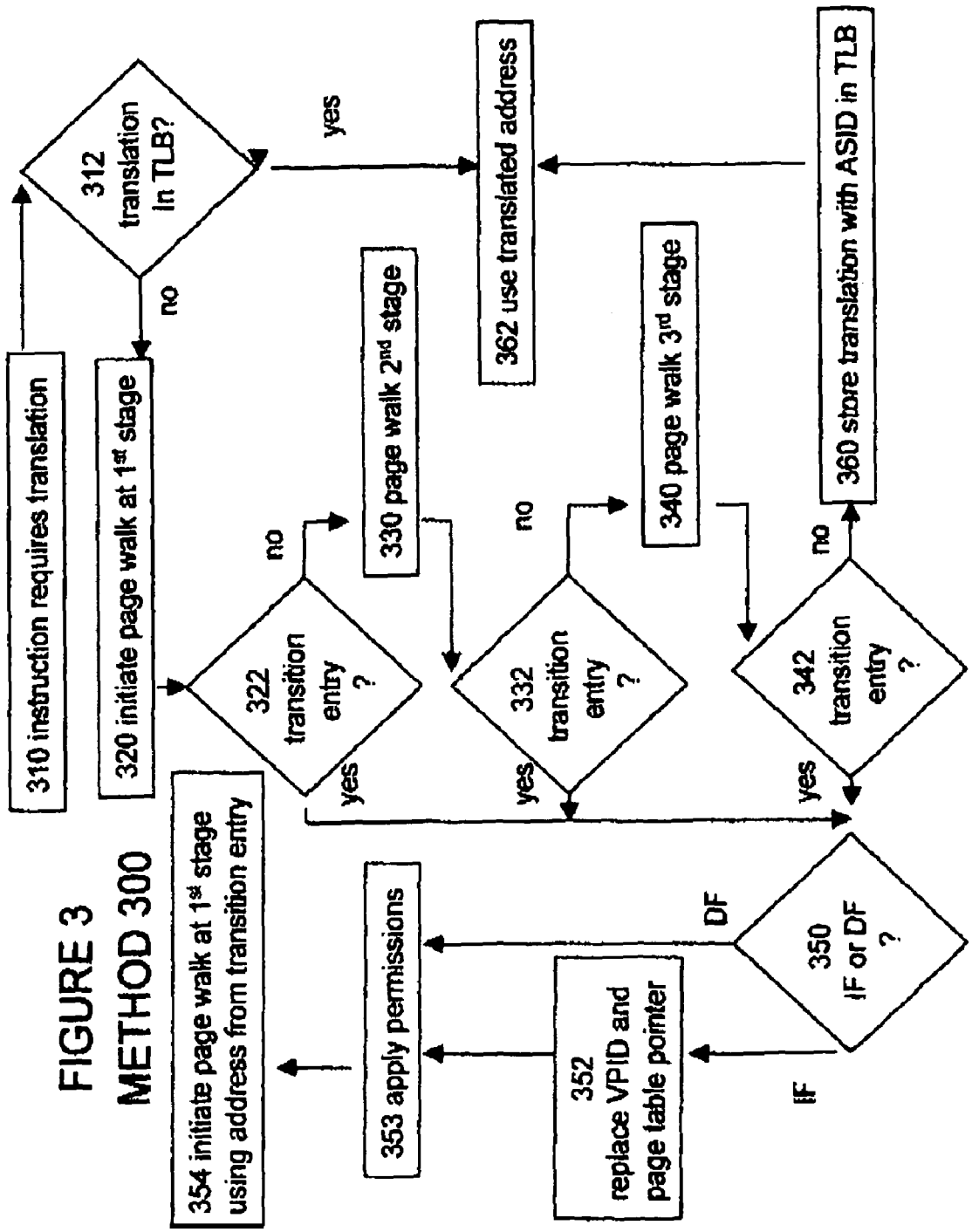
FIG. 3 illustrates a method for switching from one micro-context to a different micro-context without causing a virtual machine exit according to an embodiment of the present invention.

FIG. 3 illustrates method 300 for accessing a micro-context from a different micro-context through a transition entry in a page table according to an embodiment of the present invention. In box 310, a guest issues an instruction requiring an address translation. In box 312, a TLB is checked for the translation. If a valid translation is found in the TLB, then the translated address provided by the TLB is used in box 362. However, if a valid translation is not found in the TLB, then a page walk through the extended page tables for the guest's micro-context is required.

In box 320, the page walk begins at a first stage, using the contents of the extended page table pointer register to find the first page table, and a first portion of a guest physical address to find an entry in the first page table. In box 322, it is determined whether the entry is a transition entry. If not, then in box 330, the page walk continues to the second stage, using the contents of the entry in the first page table to find the second page table, and a second portion of the guest physical address to find an entry in the second page table. In box 332, it is determined whether the entry is a transition entry. If not, then in box 340, the page walk continues to the third stage, using the contents of the entry in the second page table to find the third page table, and a third portion of the guest physical address to find an entry in the third page table. In box 342, it is determined whether the entry is a transition entry. If not, then the translation is stored with its address source identifier ("ASID") in the TLB (as described below) in box 360, and the address portion of the entry is used as the translated address in box 362.

If, in any of boxes 322, 332, or 342, it is determined that the entry is a transition entry, then, in box 350, it is determined whether the page walk was the result of an instruction fetch of a data fetch. If the page walk was the result of an instruction fetch, then, in box 352, a micro-context switch is performed by replacing the old VPID with the new VPID, and replacing the contents of the extended page table pointer register with the address portion of the transition entry, and method 300 continues to box 354. If the page walk was the result of a data fetch, then box a micro-context switch is not performed; however, method 300 continues to box 354 to allow the guest to access data in a different micro-context.

In box 354, the page walk returns to the first stage, this time using the address portion of the transition entry to find the first page table, and the first portion of the guest physical address to find an entry in a first page table in a different micro-context. From box 354, the page walk continues to box 322.

Within the scope of the present invention, the methods illustrated in FIGS. 2 and 3 may be performed in a different order, with illustrated boxes omitted, with additional boxes added, or with a combination of reordered, omitted, or additional boxes. Note that a page walk may return to the first stage more than once, for example, when a transition entry points to a page table structure that includes another transition entry.

Many other embodiments are possible within the scope of the present invention.

In one embodiment, fields or bits in the format of a transition entry may be used to define access permissions. For example, for a data access, a read permission bit (e.g., bit 0) may be used to indicate whether a read is permitted and a write permission bit (e.g., bit 1) may be used to indicate whether a write is permitted. For an instruction fetch, an execution permission bit (e.g., bit 2) may be used to indicate whether an execution flow transition is permitted, and a transition type bit (e.g., bit 4) may be used to indicate a transition type. A first transition type may require determination logic 136 to check whether the target of the transition is aligned on a pre-determined boundary (e.g., a 64 byte boundary) before causing the transition, while a second transition type may require no such alignment check. If the values of any of these bits indicates that the access or transition is not permitted, then an error will be reported. Note that these types of permissions may be logically combined for each stage of a page walk (including a page walk through both IA32 page tables and extended page tables), such that the most restrictive of the permissions applies.

As described above, translations of GPAs to HPAs are stored in a TLB. A TLB entry for a GPA to HPA translation may include an ASID according to an embodiment of the present invention. An ASID is a value (e.g., a 2 to 8 bit integer) that identifies a unique micro-context. The ASID in a TLB entry indicates the micro-context for which the entry's translation is valid. During execution within any particular micro-context, TLB entries for the other micro-contexts may be treated as not valid. By including an ASID in TLB entries, entries do not need to be flushed when the processor switches from one micro-context to another. Therefore, these entries remain available across micro-context switches, reducing the number of page walks that need to be performed.

In one embodiment, each micro-context is completely defined by the VPID of a VM and the contents (or a portion of the contents) of the storage location for the pointer to the micro-context's extended page table. Therefore, each ASID may be derived from a combination of these two values. For example, an ASID may be based on a combination of a VPID and the address space root ("ASR") of a micro-context's page table structure. In processor architectures that allow only one ASID per VPID, a VM that has a single VPID may have only one ASID. Embodiments of the present invention provide for two or more ASIDs to be associated with a VM, so that the VM may switch from one micro-context with another without causing a VM exit.

Figure 4:
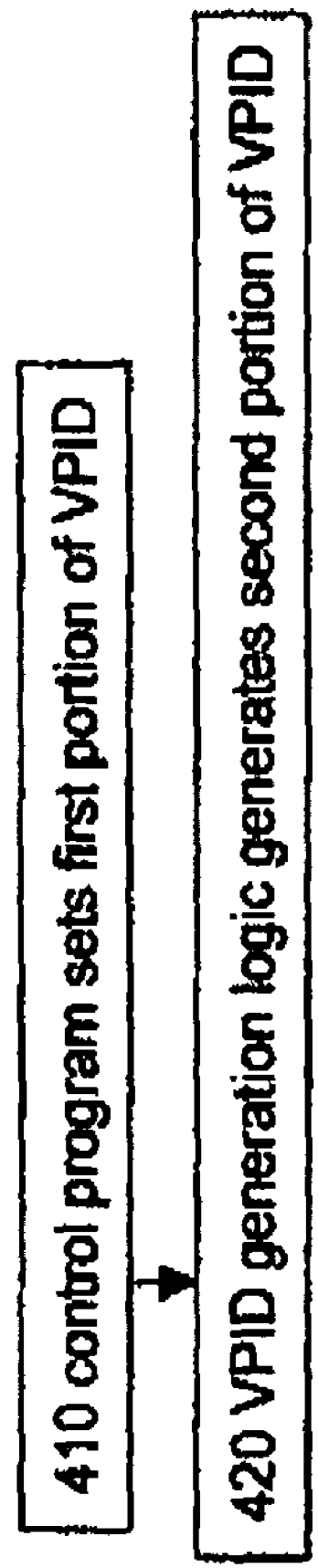
FIG. 4 illustrates a method for generating a virtual partition identifier according to an embodiment of the present invention.

One such embodiment is illustrated in FIG. 4. In box 410, a first portion of a VPID is assigned by a VMM or other control program. For example, the upper six bits of a sixteen-bit VPID may be assigned by a VMM such that the upper six bits of all VPIDs associated with any one VM are the same. The VMM may be allowed to set the upper six bits to any arbitrary value, except zero in an embodiment where a VPID of zero is used for the VMM. The lower ten bits of the sixteen-bit VPID may be defined as reserved and/or required to be set to zero. In box 420, the lower ten bits may be generated by VPID generation logic 122 such that a VM may have more than one VPID, each differing in the lower ten bits. For example, the ten bits may be a hash of a 48-bit ASR. If an embodiment of the present invention is enabled, the current VPID may be set during a VM entry and changed in block 352 as described above. Additionally, embodiments of the present invention may require that the data structure storing the ASID definitions is flushed as part of the execution of an instruction that causes the TLB to be invalidated.

According to one embodiment, a TLB entry may include an ASID, a GPA, and the HPA to which the GPA is translated by a page walk initiated in the micro-context identified by the ASID. This approach may be use for data fetch address translations, but should not be used for instruction fetch address translations. The reason is that instruction fetch address translations through a valid transition entry, according to embodiments of the present invention, should result in a change to the page table pointer. However, if the final HPA for the GPA is in the TLB, the processor would consider it a TLB hit and would not change the page table pointer.

Therefore, another approach may be used for instruction fetch address translations (this approach may also be used for data fetch address translations, but it may be slower because more passes through the TLB are needed). According to this approach, for a translation of a GPA to an HPA that goes through one or more transition entries, TLB entries are made for each transition entry. Instead of storing the GPA and the final HPA, the GPA is stored with the HPA from the address field of the transition entry. These entries are marked in the TLB as transition entries, so that the processor may determine that another GPA to HPA translation is needed, this time in the micro-context of the address from the transition entry, and the page table pointer may be changed.

The permission bits described above may also be stored in the TLB, and the most restrictive of these may be applied for multiple passes through the TLB.

Also, the TLB may be maintained by a VMM to flush the GPA to HPA translation entries for all micro-contexts that may be reached from a given value of CR3, so that the TLB is properly updated when an OS changes contexts. Also, the VMM may flush the TLB when the contents of the address translation structures are changed.

Processor 100, or any other component or portion of a component designed according to an embodiment of the present invention, may be designed in various stages, from creation to simulation to fabrication. Data representing a design may represent the design in a number of manners. First, as is useful in simulations, the hardware may be represented using a hardware description language or another functional description language. Additionally or alternatively, a circuit level model with logic and/or transistor gates may be produced at some stages of the design process. Furthermore, most designs, at some stage, reach a level where they may be modeled with data representing the physical placement of various devices. In the case where conventional semiconductor fabrication techniques are used, the data representing the device placement model may be the data specifying the presence or absence of various features on different mask layers for masks used to produce an integrated circuit.

In any representation of the design, the data may be stored in any form of a machine-readable medium. An optical or electrical wave modulated or otherwise generated to transmit such information, a memory, or a magnetic or optical storage medium, such as a disc, may be the machine-readable medium. Any of these media may "carry" or "indicate" the design, or other information used in an embodiment of the present invention. When an electrical carrier wave indicating or carrying the information is transmitted, to the extent that copying, buffering, or re-transmission of the electrical signal is performed, a new copy is made. Thus, the actions of a communication provider or a network provider may constitute the making of copies of an article, e.g., a carrier wave, embodying techniques of the present invention.

Thus, embodiments of an invention for generating multiple address space identifiers per virtual machine to switch between protected micro-contexts have been described. While certain embodiments have been described, and shown in the accompanying drawings, it is to be understood that such embodiments are merely illustrative and not restrictive of the broad invention, and that this invention not be limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principles of the present disclosure or the scope of the accompanying claims.

What is claimed is:

1. A processor comprising:
   privileged mode logic to transfer control of the processor among a plurality of virtual machines;
   an interface to perform a transaction to fetch information from a memory;
   memory management logic to translate an untranslated address to a memory address, including:
   a storage location to store a first address of a first data structure for the first translation stage of a plurality of translation stages;
   the plurality of translation stages, each translation stage having translation logic to find an entry in a corresponding data structure based on a corresponding portion of the untranslated address, each entry to store one of a second address of a second data structure for the first translation stage, an address of a data structure for a successive translation stage, and the memory address;
determination logic to determine whether an entry is storing a second address of a second data structure for the first translation stage; and
a translation lookaside buffer to store translations, each translation lookaside buffer entry including one of a plurality of address source identifiers, each address source identifier to identify a unique micro-context from a plurality of micro-contexts, each address source identifier based on one of a plurality of virtual partition identifiers, at least two of the plurality of virtual partition identifiers associated with one of the plurality of virtual machines, wherein a first portion of the at least two virtual partition identifiers is assigned by a control program; and
virtual partition identifier generation logic to generate a second portion of the at least two virtual partition identifiers, the second portion of the first of the at least two virtual partition identifiers based on the first address and the second portion of the second of the at least two virtual partition identifiers based on the second address.

2. The processor of claim 1, wherein the first portion of the first of the at least two virtual partition identifiers is the same as the first portion of the second of the at least two virtual partition identifiers.

3. The processor of claim 1, wherein the virtual partition identifier generation logic is to generate the second portion of the first of the at least two virtual partition identifiers based on a hash of the first address and the second portion of the second of the at least two virtual partition identifiers based on a hash of the second address.

4. The processor of claim 3, wherein the first address is associated with a first of the plurality of micro-contexts and the second address is associated with a second of the plurality of micro-contexts.

5. The processor of claim 4, wherein the memory management logic is to switch the one of the plurality of virtual machines from the first of the plurality of micro-contexts to the second of the plurality of micro-contexts without the privileged mode logic transferring control away from the one of the plurality of virtual machines.

6. A system comprising:
a memory; and
a processor including:
privileged mode logic to transfer control of the processor among a plurality of virtual machines;
an interface to perform a transaction to fetch information from the memory; and
memory management logic to translate an untranslated address to a memory address, including:
a storage location to store a first address of a first data structure for the first translation stage of a plurality of translation stages;
the plurality of translation stages, each translation stage having translation logic to find an entry in a corresponding data structure based on a corresponding portion of the untranslated address, each entry to store one of a second address of a second data structure for the first translation stage, an address of a data structure for a successive translation stage, and the memory address;
a translation lookaside buffer to store translations, each translation lookaside buffer entry including one of a plurality of address source identifiers, each address source identifier to identify a unique micro-context from a plurality of micro-contexts, each address source identifier based on one of a plurality of virtual partition identifiers, at least two of the plurality of virtual partition identifiers associated with one of the plurality of virtual machines, wherein a first portion of the at least two virtual partition identifiers is assigned by a control program; and
virtual partition identifier generation logic to generate a second portion of the at least two virtual partition identifiers, the second portion of the first of the at least two virtual partition identifiers based on the first address and the second portion of the second of the at least two virtual partition identifiers based on the second address.

7. The system of claim 6, wherein the virtual partition identifier generation logic is to generate the second portion of the first of the at least two virtual partition identifiers based on a hash of the first address and the second portion of the second of the at least two virtual partition identifiers based on a hash of the second address.

8. The system of claim 7, wherein the first address is associated with a first of the plurality of micro-contexts and the second address is associated with a second of the plurality of micro-contexts.

9. The system of claim 8, wherein the memory management logic is to switch the one of the plurality of virtual machines from the first of the plurality of micro-contexts to the second of the plurality of micro-contexts without the privileged mode logic transferring control away from the one of the plurality of virtual machines.

* * * * *